United States Patent [19]

Hoppe et al.

[11] Patent Number: 4,714,723
[45] Date of Patent: Dec. 22, 1987

[54] ADHESIVE SOLUTIONS, MORE ESPECIALLY FOR WATER-ACTIVATABLE ADHESIVE COATINGS ON WALLPAPERS

[75] Inventors: Lutz Hoppe; Eugen Reinhardt, both of Walsrode, Fed. Rep. of Germany

[73] Assignee: Wolff Walsrode Aktiengesellschaft, Walsrode, Fed. Rep. of Germany

[21] Appl. No.: 810,450

[22] Filed: Dec. 18, 1985

[30] Foreign Application Priority Data

Dec. 22, 1984 [DE] Fed. Rep. of Germany ....... 3447206

[51] Int. Cl.$^4$ .................... C08L 1/26; C08L 1/08; C09J 3/04
[52] U.S. Cl. .................... 524/42; 524/43; 524/44; 524/45; 524/46; 106/169; 106/189; 106/190; 106/197.1; 106/197.2
[58] Field of Search .................... 524/42, 43, 44, 45, 524/46; 106/169, 189, 190, 197.1, 197.2; 156/328, 336; 427/415; 428/532, 533

[56] References Cited

U.S. PATENT DOCUMENTS 3,899,439  8/1975  Mahlman ................ 106/189
4,302,367  11/1981 Cordes et al. ........... 524/42
4,614,545  9/1986  Hess ..................... 106/189

Primary Examiner—Maurice J. Welsh
Assistant Examiner—Nathan M. Nutter
Attorney, Agent, or Firm—Sprung Horn Kramer & Woods

[57] ABSTRACT

An adhesive solution, especially for wallpapers is prepared from:
(1) a from 2 to 20%, by weight, dispersion of cellulose ether in a $C_1$–$C_4$ aliphatic alcohol; and
(2) optionally
  (a) a from 0.05 to 2.0%, by weight, aqueous solution of methyl cellulose ether and/or hydroxyalkyl methyl cellulose ether which is soluble as well as in water as a mixture of methanol and methylene chloride and which is swellable in methanol; or
  (b) a from 2 to 40%, by weight, aqueous solution of a hydrolyzated of a copolymer of styrene and acrylonitrile, which is also soluble in methanol, an alcohol-to-water weight ratio of from 0.5:1 to 3.5:1 having to be maintained in the adhesive solution.

6 Claims, No Drawings

ADHESIVE SOLUTIONS, MORE ESPECIALLY FOR WATER-ACTIVATABLE ADHESIVE COATINGS ON WALLPAPERS

This invention relates to adhesive solutions, more especially for the formation of water-activatable adhesive coatings on web-form materials, particularly wallpaper.

In the field of wall coverings, so-called "prepasted wallpapers" are becoming of increasing interest. These prepasted or even back-coated papers are produced by the flockingmethod, i.e. the back of a paper is coated with a thin adhesive solution and ground methyl cellulose, carboxymethyl cellulose or starch or mixtures of these products are flocked into this solution.

One disadvantage of wallpaper coated in this way is that the paste granules are easily rubbed off which gives rise to problems during printing and winding into rolls.

In addition, the granular structure of the paste powder may give rise to pimple formation on the paper web (printed side) which interfaces with the rolling process.

Accordingly, an object of the present invention is to provide an adhesive solution which leads to smooth, abrasion-resistant, water-activatable adhesive layers on web-form supporting materials, more especially wallpapers with very little consumption of energy (evaporation costs and times).

According to the present invention, this object is achieved by adhesive solutions prepared from:
(1) a from 2 to 20%, by weight, preferably from 5 to 15%, by weight, suspension of cellulose ethers in an aliphatic $C_1$–$C_4$ alcohol; and
(2) optionally
  (a) from 0.05 to 2.0%, by weight, preferably from 0.1 to 1.0%, by weight, aqueous solution of methyl cellulose ether and/or hydroxyalkyl methyl cellulose ether which is soluble in water and/or in a mixture of methanol and methylene chloride; or
  (b) a from 2 to 40%, by weight, preferably from 5 to 35%, by weight, aqueous solution of a hydrolyzate of a copolymer of styrene and acrylonitrile, which is also soluble in methanol, an alcohol to water weight ratio of from 0.5:1 to 3.5:1, preferably from 1:1 to 3.2:1, being maintained in the adhesive solution.

The methyl celluloses used for the cellulose ethers 2(a) dissolved in water are of the type which swell in methanol and which are soluble in a mixture of methanol and methylene chloride (15:85). For methyl celluloses which additionally contain ether groups by reacting with ethylene oxide and/or propylene oxide and/or other molecules capable of addition, the suitable ratio of methoxy groups to added groups may readily be determined by solubility tests in the mixture of methanol and methylene chloride.

In addition, instead of the methyl cellulose ether, it is also possible to use hydrolyzates of copolymers of acrylonitrile and styrene, the hydrolyzate have to be soluble in water and to be compatible with methanol. The styrene content of the copolymer may vary from 10 to 40%, by weight, depending on the aliphatic alcohol used. Such hydrolyzates are described in DE-PS No. 20 31 972 and EP-PS No. 0 047 381.

Suitable cellulose ethers (1) suspendable in alcohol i.e. non-swellable in methanol and soluble in water, are those having degrees of substitution of from 0.3 to 2.5. Suitable cellulose ethers are: carboxymethylcellulose having a degree of substitution of from 0.3 to 1.5, preferably from 0.3 to 0.7, methyl cellulose having a degree of substitution of from 1.0 to 2.5. It is also possible to use methyl celluloses to which the desired suspendability in alcohols and solubility in water have been imparted by the incorporation of ethylene oxide and/or propylene oxide and/or synthetic polymers. The suitable ratio of methoxy groups to added groups may be determined by solubility tests; hydroxyethyl cellulose having a degree of substitution of from 1.7 to 2.8, preferably from 2.0 to 2.5.

It is also possible to use hydroxyalkyl celluloses which, in addition to hydroxyethyl or hydroxypropyl groups, also contain synthetic polymer groups. Hydroxypropyl groups only may also be present. To achieve the desired suspendability in alcohols and solubility in water, the suitable ratio or hydroxyethyl groups to added groups may be determined in simple solubility tests.

Aliphatic alcohols containing from 1 to 4 carbon atoms, for example methanol, ethanol, n-propanol, isopropanol, may be used as the alcoholic suspension medium. Methanol or ethanol is preferably used.

The adhesive solutions may readily be prepared, preferably by stirring the aqueous cellulose ether solution into the alcoholic cellulose ether suspension and optionally adding other conventional additives. If the cellulose ether suspension described in (1) is used on its own, thorough distribution must be established by means of suitable units after the alcohol-to-water ratio has been adjusted.

The adhesive solution may be applied using known surface coating units, such as roll coaters, blade coaters, nozzle coaters, glue presses, foam coaters, rotary screen coaters, etc. to web-form coating materials, such as films, fabrics, paper, webs of natural materials, such as cork, combinations of different web-form materials, such as fabric/paper, and with particular preference to wallpapers where a web-form material coated with a layer of water-activatable adhesive is obtained after a very short drying time of from 20 to 180 seconds, preferably from 15 to 120 seconds.

Accordingly, the present invention also relates to the use of the present adhesive solution for the formation of water-activatable adhesive coatings on web-form materials, more especially wallpapers, coated with a layer of water-activatable adhesive formed from the adhesive solutions according to the present invention.

The present adhesive solutions are particularly suitable for the formation of water-activatable adhesive coatings on PVC-structure-foamed wallpapers which, when foamed with conventional adhesives, lose their power of adhesion, i.e. the adhesive coating may no longer be activated with water.

EXAMPLE 1

Preparation of the cellulose ether solution 2(a)

6 g of a hydroxyethyl methyl cellulose, DS=1.7, MS=0.4 (Walocel MT 10.000 GO ®, a product of Wolff Walsrode AG) are dissolved in 500 g of water, giving a viscosity of 10,000 mPas, as measured using a 2%, by weight, solution in water (by the Hoeppler method).

Preparation of the cellulose ether dispersion (1)

174 g of a hydroxyethyl methyl cellulose, DS=1.6, MS=0.3 (Walocel MKS 8.000 PP 11 ®, a product of Wolff Walsrode AG) are suspended in 1320 g of methanol.

Preparation of the mixture

Solution 2(a) is introduced with vigorous stirring into dispersion (1) (weight ratio of methanol:water=2.64:1). A viscosity of 32,000 mPas was determined (Hake-Rotovisko, RV III, measuring system MV II, 2.83 r.p.m., 2020 C.).

The mixture was then applied to a raw wallpaper having a weight of 80 g/m² by rotary screen printing in such a quantity that, after drying, 5 g/m² of dry adhesive remained on the back of the wallpaper.

The layer of adhesive applied was so firmly anchored to the paper, that after storage and rolling no signs of damage could be found.

The front of the paper was coated with primer layer of PVC. Then PVC-plastisol was applied to rotary screen printing and foamed for 30 seconds at 20020 C. in a drying tunnel.

After placing in water for 15 seconds, the wallpaper could be applied to the walls satisfactorily.

EXAMPLE 2

Preparation of the cellulose ether solution 2(a)

6 g of a hydroxyethyl methyl cellulose, DS=1.7, MS=0.4 (Walocel MT 10.000 GO ®, a product of Wolff Walsrode AG) are dissolved in 440 g of water.

Preparation of the cellulose ether dispersion (1)

194 g of methylhydroxypropyl methyl cellulose, DS=1.3, MS=0.2 (Walocel MW 60 GA ®, a product of Wolff Walsrode AG) are suspended in 1360 g of methanol.

Preparation of the mixture

Solution 2(a) is introduced with vigorous stirring into the suspension (1) (weight ratio of methanol:water=3.09:1). A viscosity of 11,000 mPa.s was determined (Haake-Rotovisko, RV III, measuring system MV II, 2.83 r.p.m., 20° C.).

The mixture was applied to a raw wallpaper having a weight of 80 g/m² by roll coating in such a quantity that, after drying, 5 g/m² of dry adhesive remained on the back of the wallpaper.

The adhesive layer applied was so firmly anchored to the paper that after storage, rolling and unrolling the adhesive coating did not show any signs of damage.

The front of the paper was coated with primer layer of PVC. Then PVC-plasticol was applied by rotary screen printing and foamed for 30 seconds at 200° C. in a drying tunnel.

After placing in water for 15 seconds, the wallpaper could be applied to the walls satisfactorily.

EXAMPLE 3

Preparation of the cellulose ether solution 2(a)

2 g of a hydroxyethyl methyl cellulose, DS=1.7, MS=0.4 (Walocel MT 10.000 GO ®, a product of Wolff Walsrode AG) are dissolved in 480 g of water.

Preparation of the cellulose ether dispersion (1)

38 g of hydroxypropyl methyl cellulose, DS=1.9, MS=0.3 (Walocol MK 3.000 PF ®, a product of Wolff Walsrode AG) are suspended in 480 g of methanol.

Prepartion of the mixture

Solution 2(a) is introduced with vigorous stirring into suspension (1) (weight ratio of methanol:water 1:1). A viscosity of 50,000 mPa.s is determined (Haake-Rotovisko, RV III, measuring system MV II, 2.83 r.p.m., 20° C.).

The mixture was applied to a raw duplex wallpaper having a weight of 130 g/m² by blade coating in such a quantity that, after drying, 5 g/m² of dry adhesive remained on the back of the wallpaper.

The layer of adhesive applied was so firmly anchored to the paper, that after storage, rolling and unrolling the adhesive coating did not show any signs of damage.

The front of the paper was coated with primer layer of PVC. Then PVC-plastisol was applied by rotary screen printing and foamed for 30 seconds at 200° C. in a drying tunnel.

After placing in water for 15 seconds, the wallpaper could be hung satisfactorily.

EXAMPLE 4

Preparation of the cellulose ether solution 2(a)

2 g of a hydroxyethyl methyl cellulose, DS=1.7, MS=0.4 (Walocel MT 10.000 GO ®, a product of Wolff Walsrode AG) are dissolved in 480 g water.

Preparation of the cellulose ether dispersion (1)

38 g of a carboxymethyl cellulose, DS=0.8 (Walocel CRT 10.000 P ®, a product of Wolff Walsrode AG) are dispersed in 480 g of methanol.

Preparation of the mixture

Solution 2(a) is introduced with vigorous stirring into dispersion (1) (weight ratio of methanol:water=1:1). A viscosity of 50,000 mPas was determined (Haake-Rotovisko, RV III, measuring system MV II, 2.83 r.p.m., 20° C.).

The mixture was applied to a raw duplex wallpaper having a weight of 150 g/m² by blade coating in such an quantity that, after drying, 5 g/m² of dry adhesive remained on the back of the wallpaper.

The layer of adhesive applied was so firmly anchored to the paper after storage, rolling and unrolling the adhesive coating did not show any sign of damage.

The front side could be readily printed and processed into a wallpaper.

After placing in water for 15 seconds, the wallpaper could be hung satisfactorily.

EXAMPLE 5

Preparation of the cellulose ether solution 2(a)

2 g of a hydroxyethyl methyl cellulose, DS=1.7, MS=0.4 (Walocel MT 10.000 GO ®, a product of Wolff Walsrode AG) are dissolved in 320 g of water.

Preparation of the cellulose ether dispersion (1)

38 g of a hydroxyethylcellulose, MS=2.1 (Walocel HT 6.000 PFV ®, a product of Wolff Walsrode AG) are dispersed in 640 g of methanol.

Preparation of the mixture

Solution 2(a) was introduced with vigorous stirring into dispersion (1) (weight ratio of methanol:water=2:1). A viscosity of 2,000 mPas was determined (Haake-Rotovisko, RV III, measuring system MV II, 2.83 r.p.m., 20° C.).

The mixture was applied to a raw 90 g/m² wallpaper by roll coating in such a quantity that, after drying, 5 g/m² of dry adhesive remained on the back of the wallpaper.

The layer of adhesive applied was firmly anchored to the paper, as reflected in the fact that, after storage and rolling and unrolling, the adhesive coating did not show signs of damage.

The front side could be readily printed and processed into wallpaper.

After placing in water for 15 seconds, the wallpaper could be hung satisfactorily.

EXAMPLE 6

Preparation of the cellulose ether dispersion (1)

200 g of a hydroxyethyl methyl cellulose, DS=1.6, MS=0.3 (Walocel MKS 8.000 PP 11 ®, a product of Wolff Walsrode AG) are suspended in 1360 g of methanol.

Preparation of the mixture 440 g of water were introduced with vigorous stirring into the cellulose ether dispersion (1) (weight ratio of methanol:water 3.09:1). A viscosity of 38,000 mPa.s was determined (Haake-Rotovisko, RV III, measuring system MV II, 2.83 r.p.m., 20° C).

The mixture was applied to a raw wallpaper having a weight of 90 g/m² by rotary screen printing in such a quantity that, after drying, 5 g/m² dry adhesive remained on the back of wallpaper.

The layer of adhesive applied was so firmly anchored to the paper that after storage, rolling and unrolling the adhesive coating did not show any sign of damage.

The front side was coated with a primer layer of PVC. Then PVC-plastisol was applied by rotary screen printing and foamed for 30 seconds at 200° C. in a drying tunnel.

After placing in water for 15 seconds, the wallpaper could be hung satisfactorily.

EXAMPLE 7

Polymer solution 2(a)

55 g of a 20%, by weight, aqueous solution of a hydrolyzate of a styrene-acrylonitrile copolymer (styrene content: 15%, by weight, having a viscosity of 100 mPas (Haake-Rotovisko RV III, measuring system MV II, 2.83 r.p.m., 20° C.) are used.

Preparation of the cellulose ether dispersion (1)

25 g of a hydroxyethylmethylcellulose, DS=1.6, MS=0.3 (Walocel MKS 8.000 PP 11 ®, a product of Wolff Walsrode AG) are suspended in 136 g of methanol.

Preparation of the mixture

Solution 2(a) is introduced with vigorous stirring into dispersion (1) (weight ratio of methanol:water=1.74:1).

A viscosity of 67,000 mPas was determined (Haake-Rotovisko, RV III, measuring system MV II, 2.83, r.m.p., 20° C.).

The mixture was applied to a raw wallpaper having a weight of 90 g/m² by rotary screen printing in such a quantity that, after drying, 5 g/m² of dry adhesive remained on the back of the wallpaper.

The layer of adhesive applied was so firmly anchored to the paper after storage, rolling and unrolling, the adhesive coating did not show any sign of damage.

The front side was coated with a primer layer of PVC. Then PVC-plastisol was applied by rotary screen printing and foamed for 30 seconds at 200° C. in a drying tunnel.

After placing in water for 15 seconds, the wallpaper could be hung satisfactorily.

What is claimed is:

1. An adhesive solution, especially for wallpapers prepared from:
    (1) a from 2 to 20%, by weight, dispersion of cellulose ethers in an aliphatic $C_1$–$C_4$ alcohol; and
    (2)
    (a) from 0.05 to 2.0%, by weight, of an aqueous solution of methyl cellulose ether and/or hydroxyalkyl methyl cellulose ether which is soluble in water and in a mixture of methanol and methylene chloride and which is swellable in methanol or
    (b) from 2 to 40%, by weight, of an aqueous solution of a hydrolyzate, of a copolymer of styrene and acrylonitrile, which is also soluble in methanol, an alcohol-to-water weight ratio of from 0.5:1 to 3.5:1 having to be maintained in the adhesive solution.

2. A solution as claimed in claim 1 wherein the weight ratio is of from 1:1 to 3.2:1.

3. An adhesive solution as claimed in claim 1, wherein in the dispersion (1) cellulose ethers suspendable in alcohol, i.e. non-swellable in methanol and soluble in water, are those having degrees of substitution of from 0.3 to 2.5.

4. An adhesive solution as claimed in claim 3, wherein as cellulose ethers carboxymethyl cellulose having a degree of substitution of from 0.3 to 1.5 methyl cellulose having a degree of substitution of from 1.0 to 2.5, methyl cellulose to which the desired suspendability in alcohols and solubility in water have been imparted by the incorporation of ethylene oxide and/or propylene oxide and/or sythetic polymers, hydroxyalkyl cellulose having a degree of substitution of from 1.7 to 2.8.

5. An adhesive solution as claimed in claim 1, wherein as suspension medium methanol or ethanol is used.

6. An adhesive solution as claimed in claim 1, wherein in the solution (2)(b) a hydrolyzate of a copolymer of acrylonitrile and styrene having a styrene content of 10 to 40% by weight is used.

* * * * *

UNITED STATES PATENT AND TRADEMARK OFFICE
CERTIFICATE OF CORRECTION

PATENT NO. : 4,714,723
DATED : Dec. 22, 1987
INVENTOR(S) : Hoppe et al.

It is certified that error appears in the above-identified patent and that said Letters Patent is hereby corrected as shown below:

Col. 3, line 9      Delete "2020 C" and substitute --20°C--
Col. 3, line 19     Delete "20020 C" and substitute --200°C--

Signed and Sealed this

Nineteenth Day of July, 1988

Attest:

DONALD J. QUIGG

Attesting Officer    Commissioner of Patents and Trademarks